United States Patent [19]
Newman

[11] Patent Number: 5,131,341
[45] Date of Patent: Jul. 21, 1992

[54] SOLAR POWERED ELECTRIC SHIP SYSTEM

[76] Inventor: Edwin Newman, 10331 Lindley Ave., #113, Northridge, Calif. 91326

[21] Appl. No.: 621,747

[22] Filed: Dec. 3, 1990

[51] Int. Cl.$^5$ .............................................. B63H 9/04
[52] U.S. Cl. .................................... 114/39.1; 114/95; 114/102; 440/6
[58] Field of Search ..................... 440/6; 114/39.1, 95, 114/96, 97, 98, 102, 103, 104; 136/291

[56] References Cited

U.S. PATENT DOCUMENTS 4,553,037  11/1985  Veazey ............................... 136/291

FOREIGN PATENT DOCUMENTS 3836259  4/1990  Fed. Rep. of Germany ...... 114/103

Primary Examiner—Sherman Basinger
Assistant Examiner—Thomas J. Brahan
Attorney, Agent, or Firm—Monty Koslover Assoc.

[57] ABSTRACT

A system for producing and distributing electric power on a sailing ship, using arrays of photovoltaic cells covering the ships sails and rigging to generate electric power during daylight for the purpose of driving a ships screw. The solar array electric power output is processed by a voltage regulator which charges a large capacity storage battery and energizes an electric motor to drive the ships screw. An AC inverter is also provided to convert the DC power for the AC loads. To increase the area normally available on sailing ships for solar arrays, wing-booms which extend the lengths of the yards, and rolling booms above the yards are proposed for addition to the ships superstructure. The invention should make it possible for sailing ships to resume transportation of cargo without the need for auxiliary gas or oil-burning engines and a fuel supply.

4 Claims, 6 Drawing Sheets

SAIL

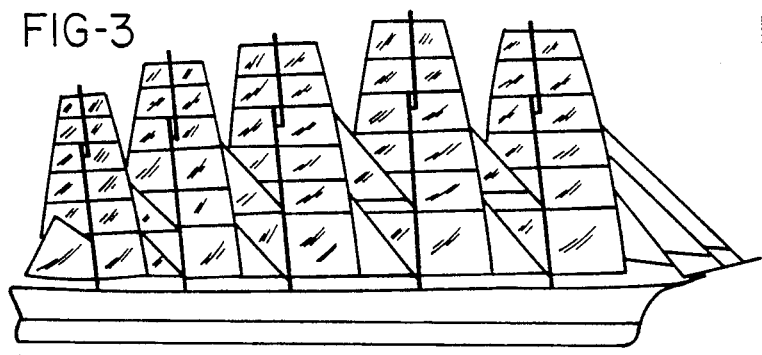
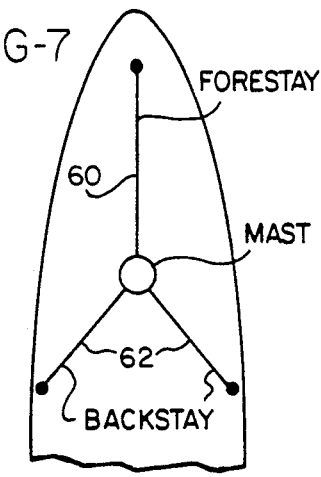
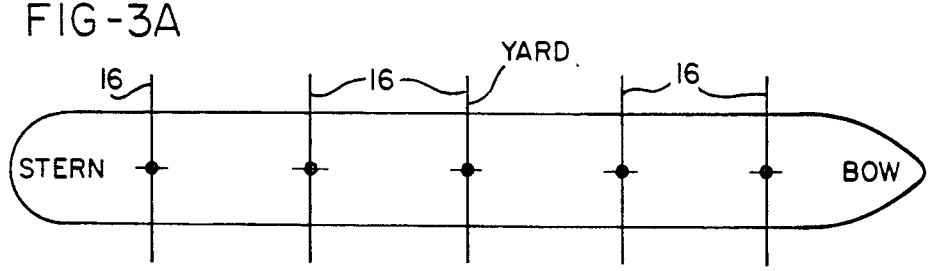
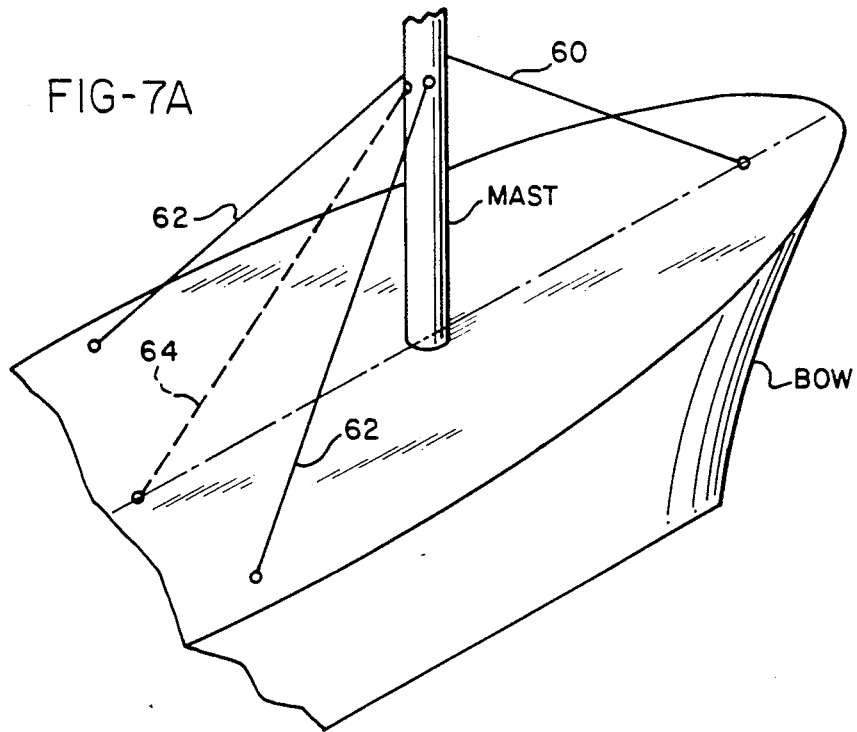

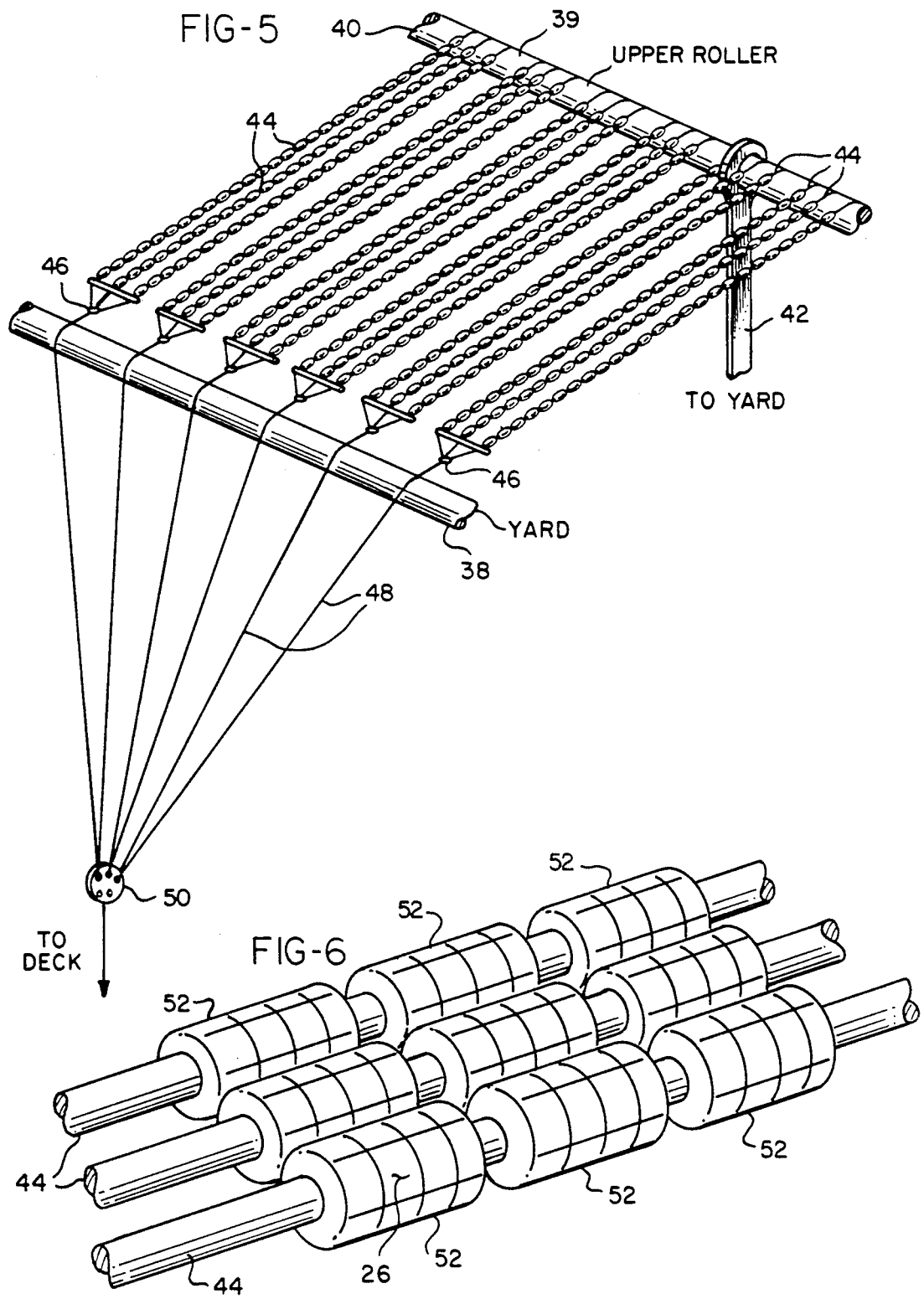

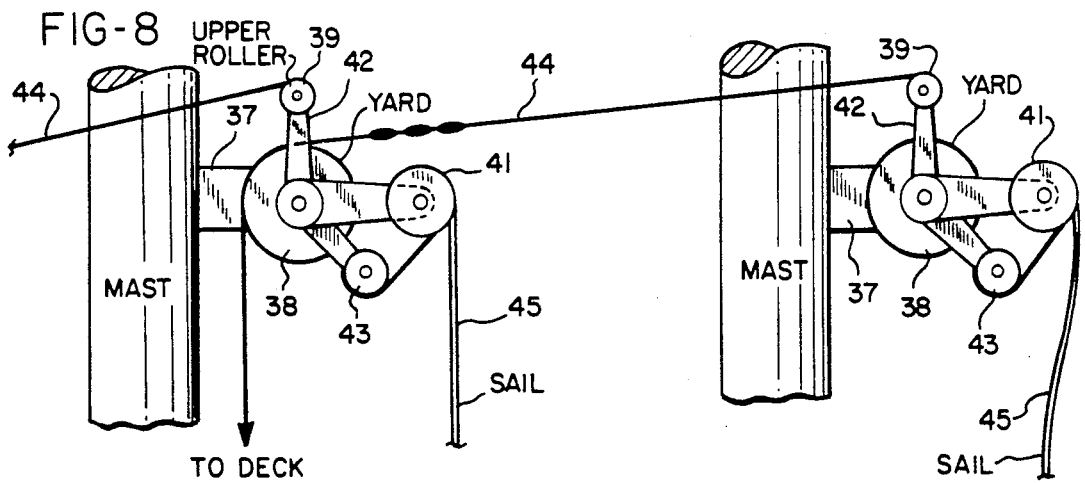
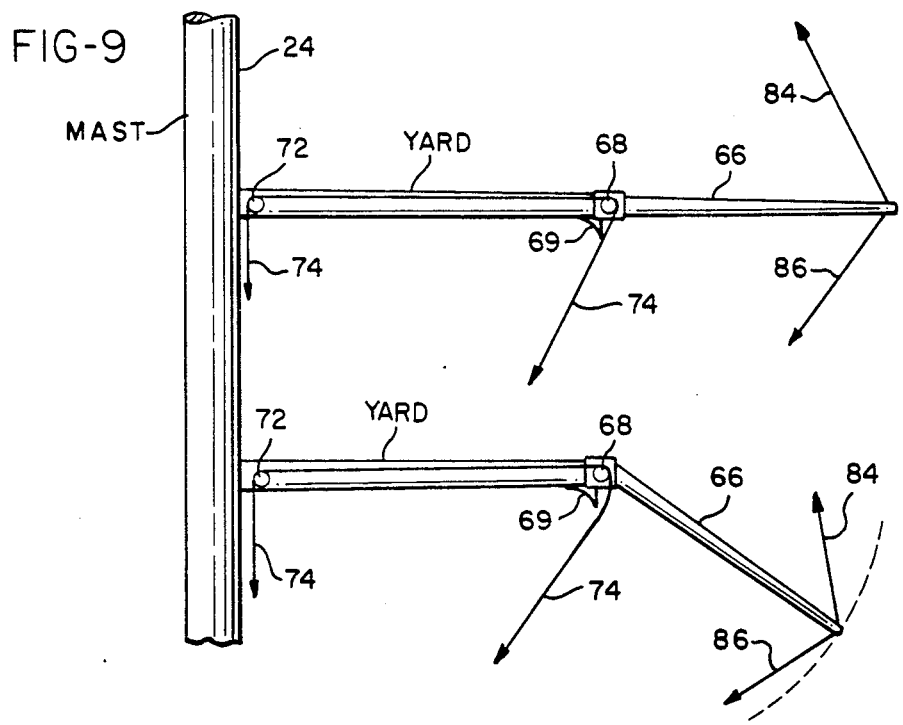
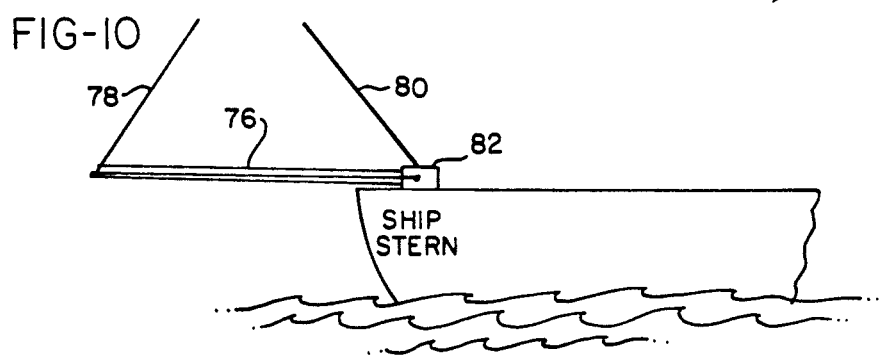

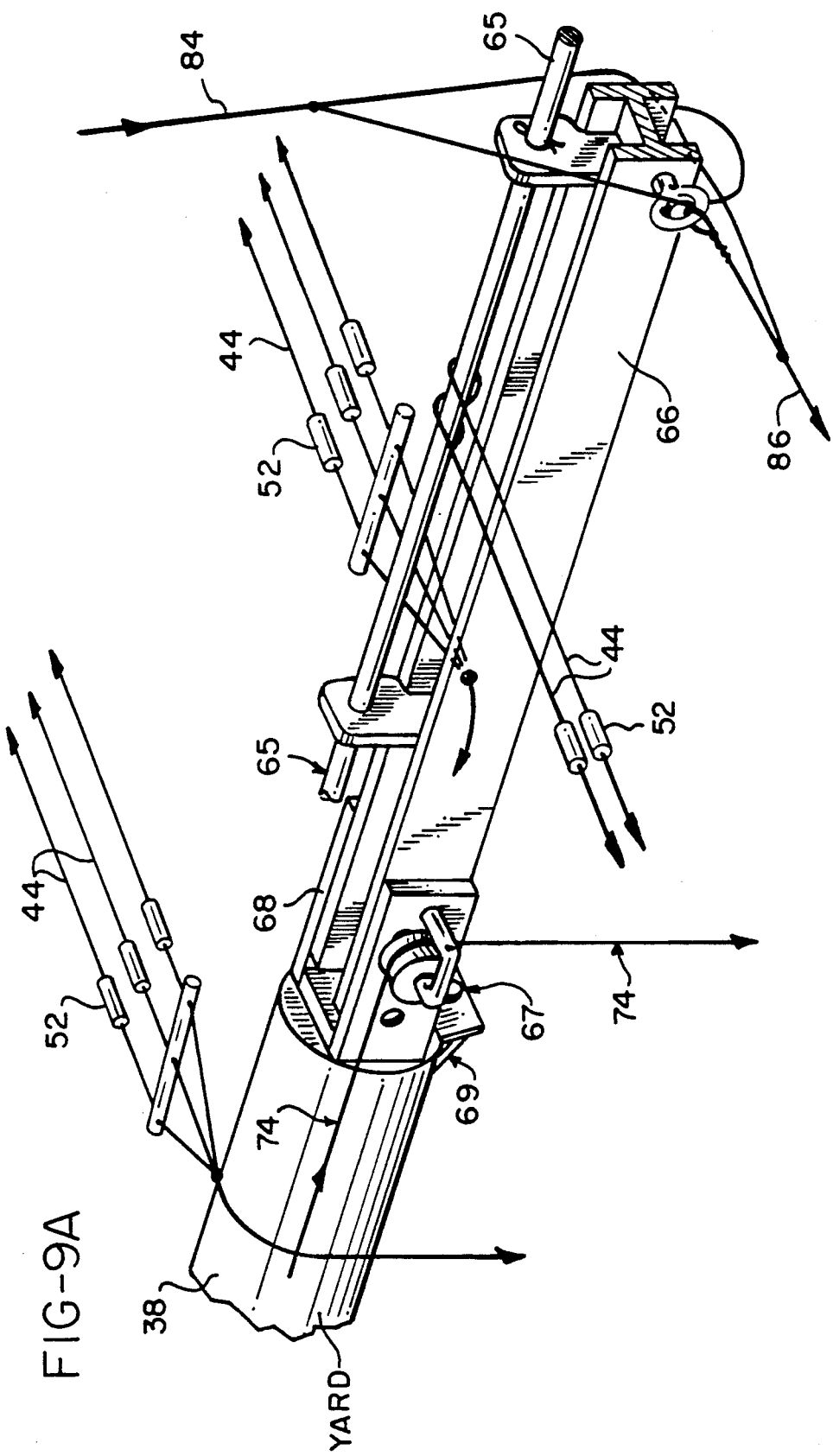

SOLAR POWERED ELECTRIC SHIP SYSTEM

BACKGROUND AND SUMMARY OF THE INVENTION

This invention relates to electrical power systems for ships and more particularly to a system for producing electrical energy using the sails and rigging of orthodox sailing ships with some modifications.

Sailing ships of various sizes have been used for centuries for transportation of goods and people. After the invention of oil-burning or combustion engines, these engines were added to the sailing ships to provide emergency motive power and auxiliary power. Nowadays, except for pleasure yachts, there are few ships in the world which use sails alone to provide their motive power. The reason is primarily because it is too dangerous and unreliable to depend only on the sails driven by the wind. Dangerous, because when in a storm with the sails reefed, it can be difficult to keep control of the ship without forward motive power. This has led to many shipwrecks. Unreliable, because when the ship is becalmed it is at the mercy of the tides and little motion in the direction of travel is accomplished. It therefore is desirable to have on board an auxiliary engine for driving the ship. However, these engines consume oil which must be carried and is growing more expensive.

A sailing ship presently uses solar energy in the form of wind on its sails to push the ship forward. It is proposed to make use of the sails and rigging, to produce electric power sufficient to store in a battery and to be used primarily for energizing an electric motor which operates ships screws to drive the ship. The electric power system would comprise thin-film solar photovoltaic arrays, mounted on both sides of the sails, photovoltaic arrays formed of beads mounted on the spars and rigging, a DC voltage regulator, a storage battery and an AC inverter, connected by cables and to the loads.

BRIEF DESCRIPTION OF THE DRAWINGS

FIG. 3 is a side elevation view of the sailing ship "PREUSSEN", showing its sail plan;

FIG. 3A is a top plan view of the sailing ship "PREUSSEN", showing its yards and approximate dimensions;

FIG. 5 is a perspective view of a solar cell beaded rope array which is suspended between two yards in accordance with the present invention;

FIG. 6 shows a group of beads on ropes, each bead having a number of photovoltaic cells on its outside surface;

FIGS. 7 and 7A are respectively, a top view and perspective view of typical ship arrangements for supporting the stresses on a mast;

FIG. 8 shows detail of the yard roller scheme, particularly showing the added upper rollers of the present invention, as required to support the strings of solar cell beaded ropes;

FIG. 9 shows wing-booms installed on two sets of yards; the wing-booms providing an increased area for support of additional solar cell beaded ropes; one wing-boom is shown being rotated downwards for clearance;

FIG. 9A shows detail of a wing-boom attachment to a yard; and

FIG. 10 shows a stern-boom attached at the ships stern and providing extended support for solar array strings.

DESCRIPTION OF THE PREFERRED EMBODIMENTS

The invention is a system for producing and distributing electric power on a sailing ship and modifications to the ships superstructure, for the purpose of energizing an electric motor to provide ship propulsion and auxiliary service power. The ship is envisaged as using wind propulsion as long as wind is available, and using the electric motor to drive screws for propulsion during calm periods or at times when an augmentation of the wind power is desirable.

Figure 1:
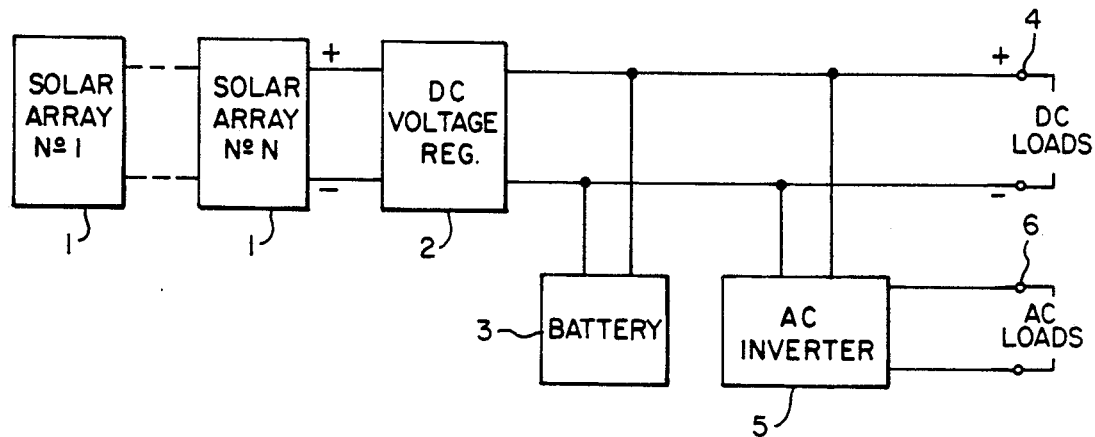
FIG. 1 is a block diagram of the solar powered electric ship system in accordance with the present invention.
Figure 2:
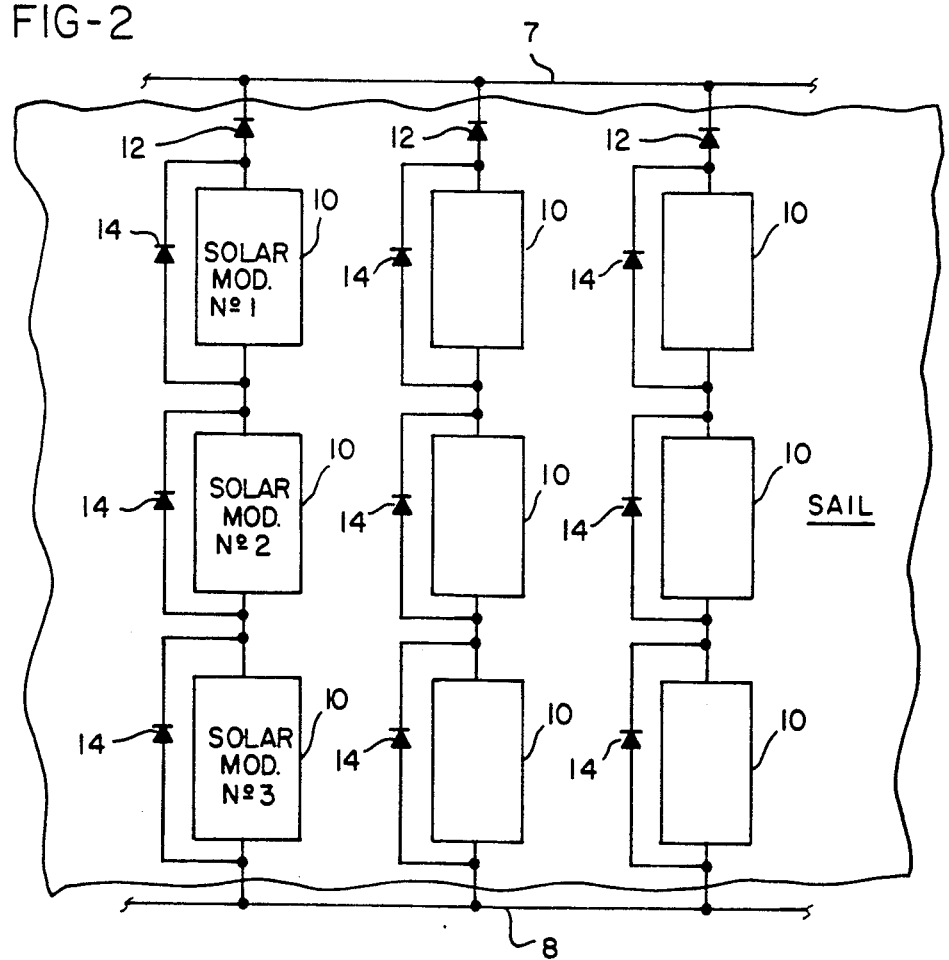
FIG. 2 is a schematic diagram of part of the solar arrays which are attached to the sails, particularly showing typical strings of solar modules.

Refer to FIGS. 1, 2 and 3. In FIG. 1, there is shown a block diagram of the proposed ships electric power system embodying the present invention. The power source means are represented by solar arrays 1, #1 through #N. The solar array 1 output is connected to a DC voltage regulator 2 which regulates the varying DC input voltage to a level suitable for charging the battery 3 and supplying the ships DC loads 4. An AC inverter 5 is connected in parallel with the battery 3 to the regulator 2 output. The inverter 5 provides single-phase or three-phase power to the ships AC loads 6 as required. During periods of darkness or during emergency, the battery 3 provides power for the loads. During sunlit hours, the solar arrays provide all electric power needs including battery charging. The battery, which would be large, would be placed in the ships ballast area, obviating the need for much non-useful ballast. Similarly, the power inverter would be placed below, and in a position to drive an electric motor for the ships screw.

FIG. 2 illustrates a typical photovoltaic solar module array electrical arrangement on a portion of sail, while FIG. 3 illustrates the sailing plan of the "PREUSSEN". She was launched in 1902 and lost in 1910 due to the fact she had no engine. A typical rigged five-mast bark such as the "PREUSSEN" would best benefit by the proposed ships electric power system.

Electric power is produced during sunlit hours by the solar arrays 1, which comprise many modules of photovoltaic cells connected in series-parallel to produce a high voltage (e.g. 200 VDC), high power output. The solar arrays, #1 thru #N, are attached to both sides of the sails and to part of the ships rigging as described later. Since the ship will need to be a fully rigged sailing ship, the ships motive power will, as always, be provided by the available wind. However, when the ship is becalmed, a DC electric motor supplied by the solar arrays or the battery will be available to provide motive power. An electric motor of 3,000 horsepower, weighing approximately 6 tons, could operate two screw propellors to drive the ship at 4 to 8 knots, depending on the size of the ship. This would be used instead of a diesel engine, consuming valuable diesel fuel.

In order to supply power to a 3,000 horsepower electric motor for at least 8 hours, the battery will require charging with approximately 17,900 kw-hrs energy, all of which must come from the solar arrays.

Referring to FIG. 2, there is shown an example of an array-diode arrangement that could be used for the solar arrays which are mounted on the sails. In order to derive the maximum electric power production, it is recommended that both sides of the sails be covered with photovoltaic solar arrays. Depending on the desired design voltage between positive bus 7 and negative bus 8, the number of solar modules 10 in each string may be three or more. Each solar module 10 in turn, may contain approximately 360 thin-film photovoltaic cells which are connected in series-parallel strings to produce 50 watts at 15 volts dc. According to published data by the industry, thin film cells have achieved solar conversion efficiencies of 14.1% and are expected to achieve at least 17% efficiency soon. This relatively high efficiency makes the goal of producing a high power electrical output, such as 1–3 Megawatts, quite practical for a sailing ship similar to the "PREUSSEN", because of the large available sail area.

Referring to the portion of solar array shown in FIG. 2, blocking diodes 12 must be placed in series with each branch of modules 10 to block reverse power flow when the branch voltage is lower than the bus 7 voltage because of shading or faults. Similarly, bypass diodes 14 are placed in parallel with each module 10 to protect against shadowing of the module 10 or an open circuit. In either event, the diode 14 becomes forward biased and shunts current around the shadowed or failed module, allowing continued operation of the branch.

FIGS. 3 and 3A respectively, show the sail plan of the "PREUSSEN" sailing ship and a top view of the ship showing the yards 16. This ship, which is used as the model for the proposed solar powered electric ship system, has the following characteristics:

displacement: 11,150 tons
cargo capacity: 8,000 tons
depth: 32.6 ft. keel to top deck
length: 440 ft.
beam: 54 ft.
sail area: 59,000 sq. ft.
normal speed: 6-8 knots The yards 16 extend on both sides of the ship for a maximum length of 70 ft. From the above, the following calculations are made: Sail area=59,000 sq.ft.=5,481.1 sq.m.

Both sides=10,962.2 sq.m.

Assuming an active solar cell area of 80% of the sail due to shading, the calculated active solar cell area is 10,962 sq.m×0.8=8,769.8 sq.m The peak solar insolation at sea level varies from 800 watts per sq.m to 1,000 watts per sq.m. Applying this to photovoltaic cells having a conversion efficiency of 15% gives:

1,000 w/sq.m×8,769.8 sq.m×0.15=1,315,470 watts or 800 w/sq.m×8,769.8 sq.m×0.15=1,052,376 watts.

Over a period of 16 hrs, the available energy for battery storage is=1,315,470×16=21,047.52 kw-hrs maximum which is sufficient to operate a 3,000 horsepower motor for 8 hours, plus an amount remaining for auxiliary power requirements. The 16 hour charging time may take place over a period of several days, depending on the amount of daylight and solar intensity. If the size of the motor is increased relative to the sails, a larger capacity storage battery and a longer battery charging time will be necessary to supply the motor.

The foregoing calculation is given as an example only. In practice, the amount of sail area covered with solar photovoltaic cells would be matched to the motor and auxiliary electrical power ship requirements. Furthermore, the solar array active area can be greatly increased by placing photovoltaic cells on selected areas of the ships rigging. This approach is illustrated in FIGS. 5 and 6.

Figure 4:
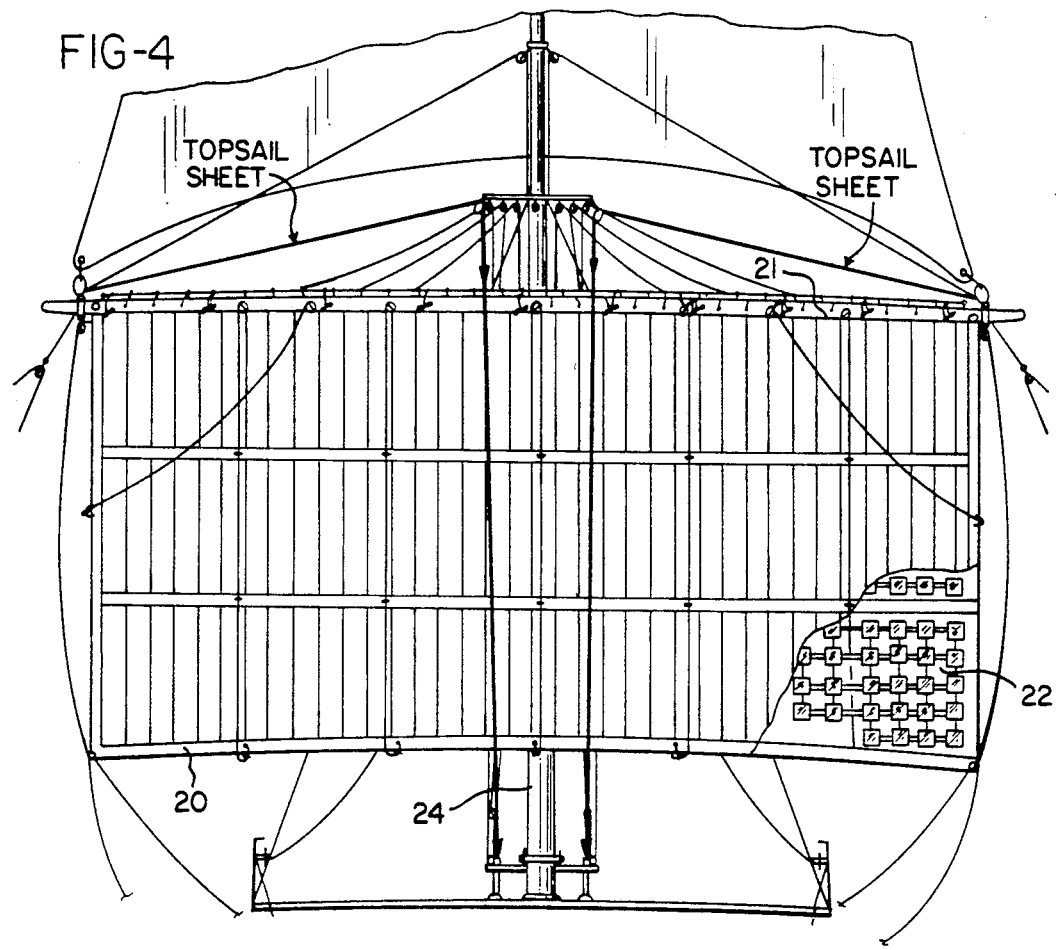
FIG. 4 is a front elevation view of a typical square sail which is to be covered with photovoltaic cells in accordance with the present invention, forming solar modules which are partially shown in one corner of the sail.
Figure 4C:
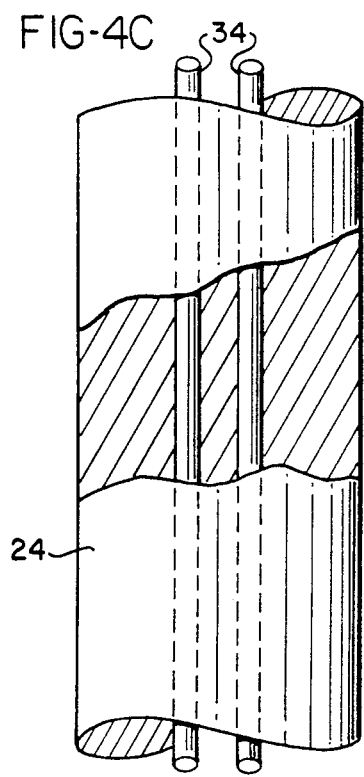
FIG. 4C is a partial view of a section of a mast, showing the main electric power cables inside the mast.
Figure 4B:
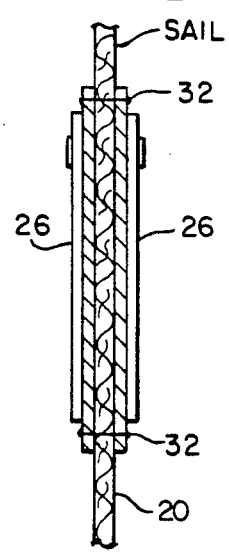
FIG. 4B is a cross-sectional view of a portion of sail, showing one method of fastening photovoltaic cells back-to-back on the sail in accordance with the present invention.
Figure 4A:
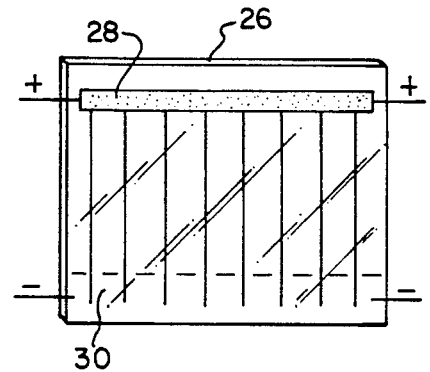
FIG. 4A is a front perspective view of a typical thin-film photovoltaic cell such as would be attached to the sails.

FIG. 4 illustrates the usual rigging of a square sail 20 and particularly, a partial view of solar modules 22 which cover the entire surface of the sail 20. The solar modules 22 are arranged in rows so that the sail can be reefed (rolled up) as required. A typical photovoltaic cell 26 is shown in FIG. 4A and its mounting method in FIG. 4B. A positive collecting grid 28 is attached to the front surface 30 of the cell 26 and the negative wire to the rear, coated surface of the cell. It should be noted that the cells are a "thin film" type and very flexible, so their attachment to a sail surface that will constantly be stretching one way or the other is not expected to present a problem.

The cells 26 are sewn 32 on to both sides of the sail 20 and their positive and negative wires joined with those of other cells to form modules. As shown in FIG. 2, these modules are connected in series to form strings which are connected in parallel to electrical buses 7, 8. At the top of the sail 20, the buses are connected to feeder cables 21 which run along the yards. These are, in turn, connected to the main cables 34 located inside the mast 24. Typically, the main cables 34 could be at 300 volts DC or higher and carrying high current. As shown in FIG. 4C, it is therefore recommended that the main cables 34 be placed within the mast 24 to protect the cables from the weather and to restrain them.

Referring now to FIGS. 5 and 6, there is shown a proposed method of arraying solar photovoltaic cells on rigging to augment those arrayed on the sails. In this case, the rigging comprises additional ropes 44 that are suspended between the yards in a manner not to interfere with the sails. FIG. 5 shows such an arrangement. The ropes 44 are fed over one yard 38 and attach to an upper roller 39 which is supported 42 by the next yard. This upper roller 39 is a beam which it is proposed to add to the yards. At the yard 38, the ropes in groups of three or more, are tied to blocks 46 and single ropes 48 from the blocks 46 are pulled over the yard and down to a main block 50 for securing to the deck.

The ropes 44 which are between the yard 38 and the upper roller 39, are covered with beads; each bead having a number of solar photovoltaic cells on its surface. A group of these beads 52 is illustrated in FIG. 6 and shown as completely covering the ropes 44. Each bead has a number of thin-film photovoltaic cells arranged over its outer surface and each bead on the rope is connected electrically to the next bead. At the end of the rope 44, the beads are connected to an electric cable for transmitting the power. A typical beaded rope on a ship the size of the "PREUSSEN" would be approximately 100 ft. long, and able to support over ninety beads. Each bead would produce from 2 to 5 watts electric power, so that the output of any given rope will be from 180 to 450 watts. At least 100 beaded ropes can be strung between each set of yards, leaving plenty of space (6 to 10 inches) for the wind to pass between the ropes when the yards are braced. Thus, the output power of any one set of beaded ropes, yard to yard, will be from 18 kw to 45 kw, representing a significant additional power source to sail arrays. Multiple levels of beaded rope systems are possible, so that the amount of additional power generated by the beaded ropes could equal or even surpass the amount generated by the sail arrays. It should be noted that the heights of the yards 38 on the masts should be adjusted where necessary to ensure that the beaded rope arrays illustrated in FIG. 5 do not have degrading effects on the ship sailing qualities.

As a result of using the beaded rope solar cell arrays described herein, some unavoidable changes will have to be made to the standard ships rigging to accommodate the extra loads placed on the yards. FIGS. 7 and 7A illustrate possible changes to the mast supports. In normal usage, the forestay 60 is on the deck center line and the backstays 62 are angled to the sides of the hull. The parrels, forestays and backstays should be increased in their load carrying capacities to carry the increased load. In addition, any rigging such as backstays 62 that would interfere with the the beaded ropes should be rerouted to the ships center line as illustrated by position 64 in FIG. 7A.

Referring now to FIGS. 8, 9, 9A and 10, there are shown illustrations of recommended additions and changes to the sailing ship superstructure to accommodate the solar cell beaded ropes and thereby increase the solar array area.

FIG. 8 shows the method by which the upper rollers 39 described earlier, may be added and supported by the parrels 37 and yards 38. The upper roller 39 is a wooden boom of a length approximately equal to that of the ships yards. It is supported fixed above and parallel to the yard 38 by one or more supports, and is able to be rotated about its axis in the same manner as any rotatable boom by an electric motor.

The yard 38 supports a rolling yard 41 which may be motor driven. The lower rolling yard 43 supplements the first rolling yard 41 and provides a protective film for the solar array on the sail to prevent chafing when it is reefed.

FIG. 9 shows wing-booms 66 added to two typical yards. Braces 74 are provided to attach to lower level wing-booms. FIG. 9A shows detail of a wing-boom structure and its method of connection to a yard 38. The wing-boom 66 comprises a lightweight I-beam section at least 10 feet in length, a hinge 68 fastened to one end of the boom, a means for fastening and storing reefed rope arrays, and eyebolts attached to its projecting end for attaching stays 84, 86. The hinge 68 bolts on to the end of the yard 38, and includes a metal portion which fits under the end of the yard 38 and projects downwards. This metal portion acts as a stop 69, preventing the wing-boom from swinging past the vertical position when it is lowered, as may be required for entering port, berthing or any time.

A means for storing reefed beaded rope arrays is provided by a rod 65 which is mounted on the boom 66 by two or more supports. The rod 65 has provision along its length for tying the ends of beaded rope arrays 44. A motor (not shown) is used to rotate the rod 65 so that it can roll up a beaded rope array. The added wing-booms 66 should not present a structural support problem for the ship mast, because the wing-booms 66 are relatively lightweight as are the added solar cell beaded ropes 44. In practice, it is expected that the beaded ropes 44 would be separated by spacing bars as illustrated in FIG. 9A.

In FIG. 10, a boom 76 similar to a wing-boom 66 is shown attached to the ships stern. The wing-boom 66 may also be used here. The boom is hinged 82 at its end so that it can be rotated upwards out of the way by the stays 78 when so desired, and is designed to support and reel-in solar cell beaded ropes which extend above to the mast.

It should be noted that there are a number of additional areas on board sailing ships which could be made to provide space for solar photovoltaic cells. Among these are flags, stiffened or not, flying from the masts and standing rigging. Thin film photovoltaic cells may be placed on either side of the flags. The electrical connections to these sub-arrays would likely form the limiting factor of use. It is estimated that significant power can be generated in this way, using a large amount of bunting. Even deck areas and the tops of hatches may be used in this manner to provide solar array space, depending on the weather. These possibilities obviously depend on a particular ship design and will necessarily vary in usefulness from ship to ship. However, it is quite certain, that for any sailing ship of any type, sufficient sail and rigging area can be made available for solar cell arrays to provide a substantial electrical power generating source.

As much solar cell area as possible must be found on the ship to make it more reliable in operation and not depend on the vagaries of the wind.

Various modifications can be made to electric power system, solar cell arrays on the sails and rigging, and to the added booms described above. These changes, in accordance with the spirit of this invention, are considered to come within the scope of the appended claims and are embraced thereby.

What is claimed is:

1. A system for generating and distributing electric power on a sailing ship having sails supported by masts and yards, comprising:
    a multiplicity of solar photovoltaic cell arrays;
    a DC voltage regulator connected to electrical power output terminals of said solar arrays;
    a storage battery connected to electrical power output terminals of said DC voltage regulator; and
    an AC inverter connected to electrical power output terminals of said DC voltage regulator;
    said multiplicity of solar arrays including sail arrays mounted on both sides of the ships sails, beaded rope rigging arrays strung between the ships masts and yards, and deck arrays; said multiplicity of solar arrays having a total area covered with solar photovoltaic cells sufficient to generate DC electrical power when illuminated, for fully charging said storage battery over a period of time, for driving a DC electric motor, and for supplying AC loads on the ship;

said voltage regulator acting to regulate the varying DC input voltage from said solar arrays to a level suitable for charging said storage battery and for supplying electrical DC loads on the ship;

said storage battery being sized for a capacity large enough to supply and operate an electric motor capable of driving a ship's screw as required;

said AC inverter being sized and rated sufficient to supply electrical AC loads on the ship.

2. A system as in claim 1 wherein:

said solar cell sail arrays comprise a multiplicity of thin-film photovoltaic cells which are electrically connected in series-parallel to form modules; said photovoltaic cells fixedly attached to the ships sails, on both sides of sail, back-to-back; said modules being electrically connected in series to form strings generating high DC voltage power, each said module having a bypass diode connected in parallel with it to protect against shadowing or open circuit; said strings each including series blocking diodes to block reverse power flow; said strings being electrically connected in parallel to form solar arrays.

3. A system as in claim 1 wherein:

said beaded rope rigging arrays each comprise three or more lengths of rope; said lengths of rope being covered with beads over a length extending at least the distance between ships masts and yards; said beads each having a multiplicity of thin-film photovoltaic cells covering its outer surface and electrically connected in series parallel to form a module; each said bead having a bypass diode connected in parallel to protect against shadowing or open circuit; each said bead being electrically connected to the next bead for the purpose of generating high voltage DC power.

4. Attachments to a sailing ship's superstructure for increasing the area available for supporting photovoltaic arrays; said attachments comprising:

a wing-boom for extending the length of a sailing ships yards to accommodate solar cell beaded rope arrays; and an upper roller boom for attachment to the ships yards to accommodate solar cell beaded rope arrays;

said wing-boom comprising a lightweight I-beam section at least 10 feet in length, a hinge fastened to one end of said I-beam section, a means for fastening and storing reefed rope arrays, and eyebolts attached to the distal end of said I-beam section, away from said hinge;

said hinge being sized to bolt on to the end of a sailing ships yard, allowing said wing-boom to be pivoted downwards with respect to said yard; said hinge incorporating a metal portion which fits under the end of said yard, projecting below it and acting as a stop for said wing-boom, preventing downward rotation movement beyond the vertical;

said means for fastening and storing reefed rope arrays including a rod which is rotated by a motor and supported by two or more supports fixedly attached to said I-beam section along its length; said rod having provision along its length for tying the ends of said beaded rope arrays to enable rolling up the arrays;

said wing-boom also able to be used as a ships stern boom, and connected to the stern of a ship for extending the area of support for solar cell beaded rope arrays;

said upper roller comprising a wooden boom of a length equal to the ships yards, each roller being located held above and parallel to a yard by a support which is attached to said yard; said upper roller being able to rotate on its longitudinal axis when driven by a motor or rotary device; said upper roller providing a means for fastening and reefing said solar cell beaded rope arrays.

* * * * *